United States Patent Office 3,629,154
Patented Dec. 21, 1971

---

3,629,154
THIN, ELECTRICALLY CONDUCTIVE, NONPOROUS POLYMERIC FILM
Martin H. Johnson, Verona, Wis., assignor to ESB Incorporated
No Drawing. Continuation-in-part of application Ser. No. 504,198, Oct. 23, 1965. This application Oct. 30, 1969, Ser. No. 872,761
Int. Cl. H01b *1/02, 1/04*
U.S. Cl. 252—511                         5 Claims

ABSTRACT OF THE DISCLOSURE

A thin, electrically conductive, nonporous polymeric film containing from about 20 to about 40% by weight of an ethylene/vinyl acetate copolymer, up to about 10% by weight of polyisobutylene, and an electrically conductive ingredient. The film, which is unsupported, has a thickness of less than about 10 mils and is particularly adapted for use as an electrical connector in an electric battery. When used as an electrical connector in a battery, the film should have a transverse electrical resistivity of less than about 5 ohm-cm. and a longitudinal electrical resistivity of less than about 2 ohm-cm.

CONTINUATION-IN-PART APPLICATION

This application is a continuation-in-part of my copending U.S. patent application Ser. No. 504,198 filed on Oct. 23, 1965, and now abandoned, and I hereby claim priority for all subject matter disclosed and/or claimed in said earlier filed application.

BACKGROUND OF THE INVENTION

Electric batteries of the LeClanche type having a flat cell construction employ thin, electrically conductive foil as intercell connectors and/or as a component of the cathode. These thin films or foil must be highly conductive in a transverse direction, i.e. through the film, and they must be nonporous in order to prevent electrolyte leakage between adjacent cells which would short circuit the battery.

Many attempts have been made to manufacture very thin, nonporous polymeric films which are electrically conductive. These attempts have generally been unsuccessful in producing films having a thickness of 10 mils or less. The reason for this lack of success is that as the amount of the conductive ingredient (e.g. metallic powder) is increased to reduce the electrical resistivity of the polymeric film sufficiently to make it a good electrical conductor, pinholes are formed when the polymeric composition is extruded, calendered, sheeted or otherwise formed into a thin film.

SUMMARY OF THE INVENTION

It is the general object of this invention to provide a thin, electrically conductive, nonporous polymeric film which is particularly adapted for use as an intercell connector in electric batteries having a flat cell construction. Other objects and advantages of the invention may be determined from the description which follows.

It has been discovered that a polymeric composition containing a large amount of an electrically conductive powder ingredient (e.g. a metallic powder) can be formed into a very thin, nonporous unsupported film. The polymeric component of this composition is an ethylene/vinyl acetate copolymer which is a binder or carrier for the electrically conductive powder ingredient. The ethylene/vinyl acetate copolymer is an essential ingredient of the composition for it is capable of accepting a very large conductive powder loading and still form a thin film which is nonporous, i.e. free of pinholes. The polymeric composition may also contain a minor amount (up to about 10% by weight) of polyisobutylene. The polyisobutylene reduces the viscosity of the polymeric composition during processing which facilitates the production of thinner films, and it also improves the adhesiveness of the electrically conductive, nonporous film.

The electrically conductive powder ingredient incorporated into the ethylene/vinyl acetate polymeric composition may be a finely divided, electrically conductive metal such as silver, gold, copper, aluminum or zinc, or it may be graphite or other forms of conductive carbon. Thin films to be used in electric batteries usually contain a conductive carbon, such as acetylene black, either alone or mixed with graphite. If desired, a mixture of conductive powders may be used. The powder ingredient is required to render the polymeric compositions and films made therefrom electrically conductive, and therefore, it must be present in an amount sufficient to form a continuous electrical path transversely through the thin film.

DETAILED DESCRIPTION

The principal advantage of the polymeric compositions of this invention is that they can be formed into very tin, nonporous, unsupported films. This overcomes the prior art problem requiring relatively thick films in order to avoid pinholes. The ethylene/vinyl acetate copolymer composition of this invention can be extruded, calendered, sheeted or otherwise formed into films which have a thickness not exceeding about 10 mils and which are nonporous and unsupported. In general, the film thickness may range from about 2 to about 10 mils, with 3 to 6 mil thicknesses being particularly preferred. An additional advantage of these ethylene/vinyl acetate copolymer compositions is that they can be formed into thin films without using a solvent. The polymeric composition can be blended by intensive mixing at an elevated temperature until a uniform dispersion is obtained, and then, the plasticized mass may be formed into a thin film and cooled to room temperature. Compositions which are highly loaded with conductive powder ingredient are difficult to form into thin films that are nonporous, and it has been found that the inclusion of up to 10% by weight of polyisobutylene reduces the viscosity of the composition during processing, i.e. mixing and sheeting, which facilitates the production of thinner films. In addition, the polyisobutylene increases the adhesiveness of the film.

Ethylene/vinyl acetate copolymers suitable for use as a binder for the electrically conductive powder in accordance with this invention can be prepared by methods well known in the art, such as those described in U.S. Pat. Nos. 2,200,429 and 2,703,794. The vinyl acetate content of the copolymer may range from about 15 to about 45% by weight. The preferred range of vinyl acetate is from 25 to 35% by weight. Ethylene/vinyl acetate copolymers having an inherent viscosity of 0.45–1.50 as determined with 0.25% of the copolymer in toluene at 30° C. are suitable, and copolymers having an inherent viscosity of 0.55–1.0 are preferred. Through the ethylene/vinyl acetate copolymer is the essential polymeric ingredient, it is present in only minor amounts. The ethylene/vinyl acetate copolymer generally comprises from about 20 to about 40% by weight of the composition, with polyisobutylene ranging up to about 10% by weight and the balance consists essentially of the electrically conductive powder ingredient.

A thin, electrically conductive, nonporous film can be made in accordance with this invention from the following typical formulation:

| Ingredient: | Amount (parts by wt.) |
|---|---|
| Ethylene/vinyl acetate copolymer | 50 |
| Acetylene carbon black | 115 |
| Graphite | 10 |

It should be noted that this composition contains over 70% by weight of carbon black and graphite which is an exceptionally large amount of conductive carbon.

The above-listed ingredients may be blended together on a rubber mill until a complete, uniform dispersion is obtained. In order to facilitate the mixing operation, it is generally preferred to plasticize the ethylene/vinyl acetate copolymer, and the polyisobutylene if it is present, prior to adding the conductive carbon ingredients. The blending is carried out at elevated temperatures so as to soften and plasticize the ethylene/vinyl acetate copolymer, and a temperature of about 120° C. has been found to be satisfactory. To insure thorough blending, the mill rolls should be operated so as to provide a high degree of working or shear in the plasticized mass, and it will generally require from about 5 to about 10 minutes to produce a uniform dispersion.

After the mixing operation, the conductive polymeric composition is sheeted to form a very thin, electrically conductive film. This film forming operation can be performed with the same rubber mill used to perform the mixing. To spread the composition into thin sheets, the mill rolls should be set at equal or approximately equal speeds. The roll temperatures are maintained at about 120° C., and the polymeric composition is passed between the rolls which are adjusted to yield a very thin film. As previously mentioned, the film thickness may range from about 2 to about 10 mils, with 4 to 6 mills being particularly preferred. The conductive polymeric film is permitted to cool to room temperature and may be stored in flat or coiled form.

The thin, electrically conductive, nonporous polymeric films of this invention are particularly adapted for use as intercell connectors or as a component of the cathode in electric batteries having a flat cell construction. When used as intercell connectors or as a component of the cathode it is essential that these films be nonporous in order to prevent electrolyte leakage between adjacent cells. It is also important that the nonporous polymeric film be electrically conductive, particularly in the transverse direction, i.e. current must flow between adjacent cells through the film. It is particularly preferred that the film have a transverse resistivity of less than about 5 ohm-cm.

The transverse resistance is tested by placing a strip of the conductive film approximately 1.25 inches long between two halves of a conductivity cell. Both halves of the conductivity cell contain a reservoir having a diameter of about 0.8 inch which is filled with clean mercury, and the conductive film to be tested is placed so as to cover the mercury-containing reservoir in each cell half. The resistance is measured with a Kelvin Bridge (Leeds and Northrup Model 4286) or equivalent, and there should be at least 5 determinations for each sample tested. After each group of 5 determinations, the resistance of the conductivity cell and mercury should be determined by closing the cell tightly without the conductive film and measuring the resistance as before. This resistance plus the lead resistance (0.00036 ohm) are subtracted from the resistance determined when the conductive film is in the conductivity cell to yield the transverse resistance of the film. The transverse resistivity is calculated using the transverse resistance value, the thickness of the film and the cross sectional area of the conductivity cell.

In addition to testing the transverse resistivity, the longitudinal resistivity of the film is also important. The longitudinal resistance increases as the film thickness and transverse resistance decrease. It is generally preferred that the longitudinal resistivity of the film be less than about about 2 ohm-cm. when tested in the following manner. A strip of film having a width of 1 1/16 inches (+/− 1/32 inch) is placed in clean clamps with smooth jaws at a span of 5 inches (+/−1/16 inch). The resistance between the clamps is measured with a conductivity bridge (Industrial Instruments Model RC 16) or equivalent, with no tension being applied to the film strip, and this resistance value is used to calculate the longitudinal resistivity.

The following examples illustrate the preparation of thin, electrically conductive, nonporous unsupported polymeric film in accordance with this invention, and the electrical conductivity of the film material:

EXAMPLE I

The following ingredients were added to a rubber mill in the order listed:

| Ingredient: | Amount (parts by wt.) |
|---|---|
| Ethylene/vinyl acetate Copolymer (ELVAX 250) | 50 |
| Graphite (Dixon 200–08) | 10 |
| Acetylene carbon black (Shawinigan) | 115 |

The mill rolls were maintained at 120° C., and the ingredients were blended for about 6 minutes. The mill rolls were set at equal speeds and maintained at 120° C. while the blended polymeric composition was passed therebetween to form a thin conductive film having a thickness of 9 mils.

This film was tested for its transverse resistance and longitudinal resistance in accordance with the procedures set forth above. These test results were used to calculate the following resistivities:

| Resistivity: | Ohm-cm. |
|---|---|
| Longitudinal | 0.53 |
|  | 0.58 |
|  | 0.63 |
| Average | 0.58 |
| Transverse | 0.72 |
|  | 0.72 |
|  | 0.71 |
|  | 0.65 |
|  | 0.72 |
|  | 0.71 |
| Average | 0.71 |

This film met the 5 ohm-cm. maximum transverse resistivity requirement, but the 9 mil thickness exceeded the preferred maximum thickness of 6 mils.

EXAMPLE II

The following ingredients were added to a rubber mill in the order listed:

| Ingredient: | Amount (parts by wt.) |
|---|---|
| Ethylene/vinyl acetate Copolymer (ELVAX 250) Shawinigan black | 50 115 |

The mill rolls were maintained at 120° C., and the ingredients were blended for about 6 minutes. The mill rolls were set at equal speeds and maintained at 120° C. while the blended polymeric composition was formed into a thin conductive film having a thickness of 6 mills.

This film was tested for its transverse and longitudinal resistance in accordance with the procedures set forth above. The test results were used to calculate the following resistivities:

| Resistivity: | Ohm-cm. |
|---|---|
| Longitudinal | 0.84 |
|  | 0.84 |
|  | 0.87 |
| Average | 0.85 |
| Transverse | 1.64 |
|  | 1.58 |
|  | 1.61 |
|  | 1.65 |
|  | 1.63 |
|  | 1.60 |
| Average | 1.62 |

This film met the 5 ohm-cm. maximum transverse resistivity requirement, but the omission of the graphite ingredient increase the transverse resistivity even though the film was thinner.

EXAMPLE III

The following ingredients were added to a rubber mill in the order listed:

| Ingredient: | Amount (parts by wt.) |
|---|---|
| Ethylene/vinyl acetate Copolymer (ELVAX 250) | 50 |
| Polyisobutylene (Vistanex L-80) | 5 |
| Shawinigan black | 115 |

The ingredients were blended together for about 6 minutes until a complete, uniform dispersion was obtained. The mill roll temperature was maintained at 120° C., and the speed of the mill rolls was varied to produce a high degree of working or shear in the plasticized mass. After mixing, the polymeric composition was sheeted using the same rubber mill, though the roll speed was adjusted to be approximately equal. The roll temperatures were maintained at 120° C. The small amount of polyisobutylene reduced the viscosity of the plasticized mass so that the thickness of the polymeric film was reduced to 5 mils.

This film was tested for its transverse and longitudinal resistance in accordance with the procedure set forth above. The test results were used to calculate the following resistivities:

| Resistivity: | Ohm-cm. |
|---|---|
| Longitudinal | 1.51 |
| | 0.60 |
| | 1.46 |
| | 1.05 |
| | 1.08 |
| | 1.08 |
| Average | 1.13 |
| Transverse | 2.71 |
| | 1.83 |
| | 1.77 |
| | 1.51 |
| | 1.45 |
| | 1.43 |
| | 2.82 |
| | 1.71 |
| | 1.71 |
| | 1.43 |
| | 1.43 |
| | 1.50 |
| Average | 1.77 |

This film met both the 5 ohm-cm. transverse resistivity requirement and the 2 ohm-cm. longitudinal resistivity requirements. This polymeric film was tested as a battery intercell connector and as a component of the cathode and was found to be a satisfactory replacement for the conductive material currently used in commercial batteries.

The thin, polymeric films of this invention are capable of being used in a variety of electrical devices in which their electrical conductivity and nonporous properties are useful. As previously indicated, these films are particularly useful for making electrical contact in electric batteries for they are impermeable by the electrolyte, and their electrical conductivity and thinness combine to yield a low resistivity.

In the examples, the polymeric film was rendered electrically conductive by incorporating a carbon black powder in the ethylene/vinyl acetate copolymer. As previously indicated, it is within the scope of this invention to use other conductive metal powders such as silver, gold, copper, aluminum or zinc. It should be noted that one or more of the conductive metal powders which are incorporated in the polymeric film may be soluble in certain electrolytes, either alkaline or acid, in which case they should not be used if electrolyte impermeability is desired.

Having completely described this invention, what is claimed is:

1. A thin, electrically conductive, nonporous polymeric film consisting essentially of from about 20 to about 40% by weight of an ethylene/vinyl acetate copolymer, up to about 10% by weight of polyisobutylene, with the balance of the film material being an electrically conductive ingredient selected from silver, gold, copper, aluminum, zinc, graphite or carbon black in an amount sufficient to form a continuous electrical path through the film, said film having a thickness of less than about 10 mils and a transverse electrical resistivity of less than about 5 ohm-cm.

2. A polymeric film in accordance with claim 1 in which the film thickness ranges from about 3 to about 6 mils.

3. A polymeric film in accordance with claim 1 in which the film has a longitudinal electrical resistivity of less than about 2 ohm-cm.

4. A polymeric film in accordance with claim 3 in which the electrically conductive ingredient is carbon black.

5. A polymeric film in accordance with claim 4 in which the film thickness ranges from about 3 to about 6 mils.

References Cited

UNITED STATES PATENTS

| 3,173,885 | 3/1965 | Short | 252—503 |
| 3,178,384 | 4/1965 | Rice | 260—28.5 |
| 3,259,688 | 7/1966 | Towne et al. | 252—511 |
| 3,318,977 | 5/1967 | Battersby et al. | 260—897 B |

DOUGLAS J. DRUMMOND, Primary Examiner

U.S. Cl. X.R.

260—41, 896; 252—514